J. VOAK.
Curry Brush.
No. 46,510.
Patented Feb. 21, 1865.
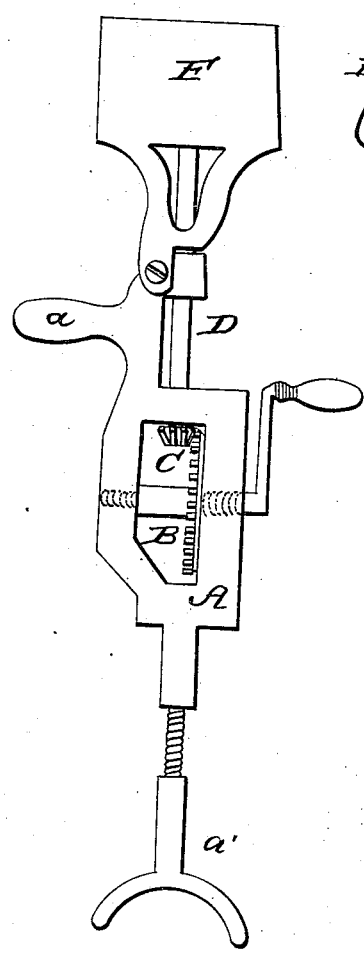
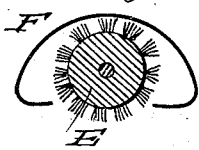

UNITED STATES PATENT OFFICE.

JOHN VOAK, OF PENN YAN, NEW YORK.

IMPROVED CURRY BRUSH OR CURD.

Specification forming part of Letters Patent No. 46,510, dated February 21, 1865.

*To all whom it may concern:*

Be it known that I, JOHN VOAK, of Penn Yan, in the county of Yates and State of New York, have invented a new and Improved Curry Brush or Card; and I do hereby declare that the following is a full, clear, and exact description of the construction and operation of the same, reference being had to the annexed drawings, making a part of this specification, in which—

Figure 1 represents the upper side of the whole implement. Fig. 2 is a transverse section of the brush and dust-receptacle.

The letters of reference refer to the same parts in each figure.

The nature of my invention consists in making a revolving brush or card to be used for cleaning horses and other animals, and providing the brush with such machinery that it may be readily actuated by the operator and be used with facility by a groom on all parts of the horse.

A is the frame that holds the parts of the implement in place. It may be made in shape as shown in the figure, or may be made any other shape that fancy may require. It is provided with a handle, as shown by the letter $a$, and it should be firmly attached to the frame, so that with the left hand the implement may be held and guided. At the rear end is a revolving handle, provided with circular cross-piece $a'$, made in such manner that it may be held against the body or against the forward part of the shoulder of the operator. This handle is screwed into the rear portion of the frame, so that its length may be increased or diminished at will.

B is the driving-wheel of bevel-gear, and it is fitted to drive the pinion C. It may be any size required to give the required motion to the brush. The axle of this wheel is provided with a crank, that the operator takes hold of with the right hand and turns the wheel with the required velocity.

C is a bevel-pinion, securely fastened to the spindle that supports the brush.

D is a spindle that is held within the forward part of the frame, as shown in Fig. 1, and may be made any size or length required. The forward end must be made so that the brush may be readily fastened to it.

E is a cylindrical brush or card of any size required. The brush may be made of bristles, as other brushes, or be made of wire, as cards are made, or in any other manner. Two or more brushes may be fitted to the same implement, each differing from the other in shape and strength.

F is a dust-receptacle, made as shown in Figs. 1 and 2. It is fastened to the forward part of the frame A, and the spindle D passes through one end of the receptacle, and the spindle thereby aids in keeping it in proper position.

To use my invention, clasp the handle $a$ with the left hand, then place the rear part against the body or forward part of the shoulder, then take hold of the crank with the right hand and turn it, apply the brush to the horse, and keep moving it about upon the horse and turning the crank until the horse is cleaned.

What I claim as my invention, and desire to secure by Letters Patent, is—

The frame A, handle $a$, shoulder-rest $a'$, and gearing C B, in combination with the brush E and receptacle F, the several parts being constructed, arranged, and operating as set forth.

JOHN VOAK.

Witnesses:
JOHN L. LEWIS,
CHARLES KETCHUM.